United States Patent
Araki et al.

(10) Patent No.: US 11,908,598 B2
(45) Date of Patent: *Feb. 20, 2024

(54) INSULATED ELECTRIC WIRE AND HARNESS WITH WATER-STOPPING AGENT AND WIRE HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Kenichiro Araki, Yokkaichi (JP); Toyoki Furukawa, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 242 days.

This patent is subject to a terminal disclaimer.

(21) Appl. No.: 17/426,577

(22) PCT Filed: Jan. 30, 2019

(86) PCT No.: PCT/JP2019/003195
§ 371 (c)(1),
(2) Date: Jul. 28, 2021

(87) PCT Pub. No.: WO2020/157867
PCT Pub. Date: Aug. 6, 2020

(65) Prior Publication Data
US 2022/0165453 A1    May 26, 2022

(51) Int. Cl.
*H01B 7/285* (2006.01)

(52) U.S. Cl.
CPC .................................. *H01B 7/285* (2013.01)

(58) Field of Classification Search
None
See application file for complete search history.

(56) References Cited

U.S. PATENT DOCUMENTS 2,396,702 A * 3/1946 Johnson .................. H02G 15/14
174/23 R
3,639,567 A * 2/1972 Hervig .................. H01B 13/221
264/331.19

(Continued)

FOREIGN PATENT DOCUMENTS

CA         2202191 A1  * 10/1997
CN       87102361 A   * 10/1987       ............... C09D 5/44

(Continued)

OTHER PUBLICATIONS

Mar. 10, 2022 Office Action issued in Indian Patent Application No. 202117036240.

(Continued)

*Primary Examiner* — Timothy J. Dole
*Assistant Examiner* — Muhammed Azam
(74) *Attorney, Agent, or Firm* — Oliff PLC

(57) ABSTRACT

An insulated electric wire with a water-stopping portion has excellent water stopping performance and forms quickly, and a wire harness includes the insulated electric wire. An insulated electric wire includes: a conductor wherein multiple metal material elemental wires are twisted together; and an insulation covering covers an outer circumference of the conductor. The insulated electric wire includes an exposed portion wherein the insulation covering is removed; a covered portion wherein the insulation covering covers the conductor, the exposed and covered portions are adjacent to each other in a longitudinal axis direction; and a water-stopping portion wherein gaps between the wires in the (Continued)

exposed portion are filled with a water-stopping agent. At least a portion of the water-stopping agent contacting the wires is made of a resin material that cures upon contact. A wire harness includes the insulated electric wire, and electric connections capable of other device connection at both ends, each capable of other device connection.

14 Claims, 5 Drawing Sheets

(56) References Cited

U.S. PATENT DOCUMENTS

| | | | | | |
|---|---|---|---|---|---|
| 3,737,557 | A | * | 6/1973 | Verne | H01B 9/00 |
| | | | | | 174/23 R |
| 4,361,507 | A | * | 11/1982 | Bourland | C08L 53/025 |
| | | | | | 524/505 |
| 4,978,694 | A | * | 12/1990 | Vincent | H01B 13/322 |
| | | | | | 524/506 |
| 5,281,757 | A | * | 1/1994 | Marin | H01B 9/022 |
| | | | | | 174/106 SC |
| 5,902,849 | A | * | 5/1999 | Heucher | G02B 6/4401 |
| | | | | | 585/12 |
| 7,952,020 | B2 | * | 5/2011 | Yamamoto | H01R 13/5208 |
| | | | | | 174/23 R |
| 9,853,342 | B2 | * | 12/2017 | Henry | H01P 3/16 |
| 9,949,392 | B1 | * | 4/2018 | Ushiro | H01B 7/2825 |
| 2006/0063418 | A1 | * | 3/2006 | Motzigkeit | H02G 15/013 |
| | | | | | 439/425 |
| 2007/0007038 | A1 | * | 1/2007 | Cox | H02G 15/013 |
| | | | | | 174/650 |
| 2008/0283268 | A1 | | 11/2008 | Iwasaki et al. | |
| 2010/0212936 | A1 | * | 8/2010 | Arai | H01B 7/285 |
| | | | | | 29/857 |
| 2011/0048762 | A1 | * | 3/2011 | Sawamura | H01B 3/441 |
| | | | | | 228/110.1 |
| 2012/0097414 | A1 | * | 4/2012 | O'Sullivan | H02G 3/088 |
| | | | | | 174/50 |
| 2012/0217036 | A1 | | 8/2012 | Kuriyagawa | |
| 2014/0299353 | A1 | * | 10/2014 | Saito | H01B 7/282 |
| | | | | | 29/868 |
| 2015/0349473 | A1 | * | 12/2015 | Montena | H02G 15/18 |
| | | | | | 174/88 C |
| 2016/0027552 | A1 | | 1/2016 | Kuriyagawa et al. | |
| 2016/0260523 | A1 | * | 9/2016 | Aragiri | H01B 7/282 |
| 2017/0243673 | A1 | * | 8/2017 | Nakashima | C09J 133/14 |
| 2019/0096543 | A1 | * | 3/2019 | Itou | H02G 15/003 |
| 2020/0286648 | A1 | * | 9/2020 | Furukawa | H01B 7/0009 |

FOREIGN PATENT DOCUMENTS

| | | | | | |
|---|---|---|---|---|---|
| CN | 1365123 | A | * | 8/2002 | H01B 13/322 |
| CN | 1465617 | A | * | 1/2004 | |
| CN | 101248558 | A | | 8/2008 | |
| CN | 102598161 | A | | 7/2012 | |
| CN | 103119662 | A | * | 5/2013 | H01B 7/282 |
| CN | 103907161 | A | | 7/2014 | |
| CN | 105122382 | A | | 12/2015 | |
| CN | 106847407 | A | | 6/2017 | |
| CN | 106898419 | A | * | 6/2017 | G02B 6/443 |
| CN | 206370303 | U | * | 8/2017 | |
| CN | 107851491 | A | | 3/2018 | |
| CN | 109065232 | A | * | 12/2018 | |
| CN | 109074914 | A | | 12/2018 | |
| DE | 3708216 | A1 | * | 9/1998 | |
| DE | 202012010582 | U1 | * | 2/2013 | H02G 3/088 |
| DE | 10 2011 083 952 | A1 | | 4/2013 | |
| DE | 112019006772 | T5 | * | 10/2021 | B60R 16/0207 |
| EP | 0720179 | A2 | * | 9/1995 | |
| EP | 0332821 | A2 | * | 1/1998 | |
| FR | 2472820 | A1 | * | 7/1981 | |
| FR | 2500202 | A1 | * | 8/1982 | |
| JP | S53-014169 | U | | 2/1978 | |
| JP | 62040406 | A | * | 2/1987 | G02B 6/4401 |
| JP | H07105746 | A | * | 4/1995 | |
| JP | H08335411 | A | * | 12/1996 | |
| JP | H09102222 | A | * | 4/1997 | |
| JP | H09204822 | A | * | 8/1997 | |
| JP | H09205714 | A | | 8/1997 | |
| JP | H1051935 | A | * | 2/1998 | |
| JP | H10204227 | A | * | 8/1998 | |
| JP | H11224541 | A | * | 8/1998 | |
| JP | 2000-011771 | A | | 1/2000 | |
| JP | 2000011771 | A | * | 1/2000 | |
| JP | 2000-082834 | A | | 3/2000 | |
| JP | 2003051217 | A | * | 2/2003 | |
| JP | 2004221047 | A | * | 8/2004 | H01B 7/285 |
| JP | 2004355897 | A | * | 12/2004 | |
| JP | 2005-019392 | A | | 1/2005 | |
| JP | 2005-032621 | A | | 2/2005 | |
| JP | 2005048080 | A | * | 2/2005 | |
| JP | 2006032127 | A | * | 2/2006 | |
| JP | 2006074068 | A | * | 3/2006 | |
| JP | 2007-134137 | A | | 5/2007 | |
| JP | 2007-141569 | A | | 6/2007 | |
| JP | 2007-226999 | A | | 9/2007 | |
| JP | 2007-287647 | A | | 11/2007 | |
| JP | 2007-317480 | A | | 12/2007 | |
| JP | 2008-117616 | A | | 5/2008 | |
| JP | 2008123712 | A | * | 5/2008 | |
| JP | 2008226487 | A | * | 9/2008 | |
| JP | 2009-135073 | A | | 6/2009 | |
| JP | 2009231099 | A | * | 10/2009 | |
| JP | 2010114027 | A | * | 5/2010 | |
| JP | 2010136485 | A | * | 6/2010 | |
| JP | 2010154733 | A | * | 7/2010 | C08F 283/008 |
| JP | 2010231978 | A | * | 10/2010 | |
| JP | 2011-096567 | A | | 5/2011 | |
| JP | 2012-248527 | A | | 12/2012 | |
| JP | 2013-097922 | A | | 5/2013 | |
| JP | 5475158 | B1 | * | 4/2014 | |
| JP | 2014100010 | A | * | 5/2014 | |
| JP | 2014-107976 | A | | 6/2014 | |
| JP | 2014107976 | A | * | 6/2014 | |
| JP | 2014-519137 | A | | 8/2014 | |
| JP | 2016-119168 | A | | 6/2016 | |
| JP | 2016-225112 | A | | 12/2016 | |
| WO | WO-9207366 | A1 | * | 4/1992 | H01B 7/0208 |
| WO | WO-03085793 | A1 | * | 10/2003 | H01R 13/5216 |
| WO | 2007/013589 | A1 | | 2/2007 | |
| WO | WO-2007013589 | A1 | * | 2/2007 | H01B 7/285 |
| WO | WO-2007052693 | A1 | * | 5/2007 | H01B 7/285 |
| WO | WO-2007088798 | A1 | * | 8/2007 | H01B 3/28 |
| WO | WO-2008040626 | A1 | * | 4/2008 | B60R 16/0207 |
| WO | 2009/060639 | A1 | | 5/2009 | |
| WO | WO-2009136460 | A1 | * | 11/2009 | B60R 16/0207 |
| WO | WO-2009139220 | A1 | * | 11/2009 | H01B 7/285 |
| WO | WO-2012042979 | A1 | * | 4/2012 | H01B 7/2825 |
| WO | WO-2014125666 | A1 | * | 8/2014 | B60R 16/0215 |
| WO | 2014/135615 | A1 | | 9/2014 | |
| WO | WO-2014168200 | A1 | * | 10/2014 | H01B 13/0013 |
| WO | WO-2019021850 | A1 | * | 1/2019 | H01B 7/02 |
| WO | 2019/177016 | A1 | | 9/2019 | |
| WO | WO-2019188062 | A1 | * | 10/2019 | C08F 2/14 |
| WO | WO-2020157867 | A1 | * | 8/2020 | H01B 7/285 |
| WO | WO-2020157868 | A1 | * | 8/2020 | B60R 16/0207 |
| WO | WO-2020158445 | A1 | * | 8/2020 | H01B 7/0045 |
| WO | WO-2020158862 | A1 | * | 8/2020 | B60R 16/0207 |

OTHER PUBLICATIONS

Mar. 10, 2022 Office Action issued in Indian Patent Application No. 202117036742.
Mar. 17, 2022 Office Action issued in Indian Patent Application No. 202117036460.
Feb. 24, 2022 Office Action issued in Indian Patent Application No. 202117036512.
Mar. 28, 2023 Office Action issued in Chinese Patent Application No. 201980089342.6.
Apr. 4, 2023 Office Action issued in Japanese Patent Application No. 2019-219009.

(56) References Cited

OTHER PUBLICATIONS

Feb. 26, 2019 Search Report issued in International Patent Application No. PCT/JP2019/003195.
Jun. 2, 2022 Office Action issued in Chinese Patent Application No. 202080011663.7.
Jul. 20, 2022 Office Action issued in Chinese Patent Application No. 201980089342.6.
Sep. 20, 2022 Office Action issued in Japanese Patent Application No. 2020-569238.
Aug. 10, 2022 Office Action issued in Chinese Patent Application No. 202080011525.9.
Sep. 20, 2022 Office Action issued in Japanese Patent Application No. 2020-569239.
Mar. 31, 2020 Search Report issued in International Patent Application No. PCT/JP2020/003430.
Feb. 25, 2020 International Search Report issued in International Patent Application No. PCT/JP2020/001453.
Apr. 23, 2019 International Search Report issued in International Patent Application No. PCT/JP2019/003196.
U.S. Appl. No. 17/427,375, filed Jul. 30, 2021 in the name of Araki et al.
U.S. Appl. No. 17/426,581, filed Jul. 28, 2021 in the name of Araki et al.
U.S. Appl. No. 17/426,530, filed Jul. 28, 2021 in the name of Araki et al.
Jun. 16, 2023 Office Action issued in U.S. Appl. No. 17/426,581.
Efunda_reference; Silicone/polyester; https://www.efunda.com/materials/polymers/properties/polymer_datasheet.cfmMajorID=TPE&MinorID=9 (Year: 2023).
Jun. 22, 2023 Office Action issued in U.S. Appl. No. 17/427,375.
Oct. 17, 2023 Notice of Allowance issued in U.S. Appl. No. 17/426,581.
Oct. 26, 2023 Notice of Allowance issued in U.S. Appl. No. 17/427,375.

* cited by examiner

INSULATED ELECTRIC WIRE AND HARNESS WITH WATER-STOPPING AGENT AND WIRE HARNESS

TECHNICAL FIELD

The present invention relates to an insulated electric wire and a wire harness, and more specifically to an insulated electric wire and a wire harness that have a water-stopping portion in which an insulation covering is removed and water-stopping treatment is applied using a water-stopping agent.

BACKGROUND ART

In some cases, water-stopping treatment is applied to a portion of an insulated electric wire in the longitudinal axis direction of the wire. For example, Patent Document 1 discloses an electric wire with a water-stopping portion that includes a twisted conductor and an insulation covering, in which the twisted conductor is continuous in the length direction while the insulation covering is cut by an appropriate length and is discontinuous in the length direction. In a portion in which the insulation covering is cut and the twisted conductor is exposed, the water-stopping portion is formed in which gaps between elemental wires of the twisted conductor and gaps between the outer circumferential surface of the twisted conductor and cut surfaces of the insulation covering are filled with a water-stopping resin, and the water-stopping resin is adhesively attached to the cut surfaces of the insulation covering.

In Patent Document 1, when the water-stopping portion is formed, steps from covering the outer circumferential surface of the twisted conductor with the water-stopping resin and injecting the water-stopping resin into the gaps between elemental wires of the twisted conductor, to holding the water-stopping resin attached to the outer circumferential surface of the twisted conductor between the cut surfaces of the insulation covering are performed before the liquid water-stopping resin is solidified. Also, the water-stopping resin held between the cut surfaces of the insulation covering is solidified with time, and is adhesively attached to the cut surfaces of the insulation covering.

CITATION LIST

Patent Document

Patent Document 1: JP 2000-11771 A

SUMMARY OF INVENTION

Technical Problem

As described in Patent Document 1, by placing an unsolidified water-stopping agent in gaps between elemental wires and on the outer circumference of a conductor and then solidifying the placed water-stopping agent, it is possible to form a water-stopping portion with the water-stopping agent permeating even minute gaps between the elemental wires. To allow a water-stopping agent to be placed at a predetermined position in a highly fluent state and then be solidified as described above, a curable resin that is curable from a liquid state to a solid state by an external operation or environmental control is preferably used as the water-stopping agent. There are various types of curable resins with curing mechanisms through operations or environmental control, but Patent Document 1 does not disclose which kind of resin material with a curing mechanism should be used as the water-stopping agent.

However, in view of ensuring an excellent water-stopping performance in the water-stopping portion, it is important that a water-stopping agent is cured from a liquid state to a solid state while adhering to the elemental wires constituting the conductor. Also, in view of productivity when forming water-stopping portions in a plurality of insulated electric wires, it is preferable that a water-stopping portion having an excellent water-stopping performance be able to be formed in a short time. As will be described in detail later, the inventors of the present invention found in their study that it may be impossible to form a water-stopping portion having a sufficient water-stopping performance or it may take long time to form a water-stopping portion having a sufficient water-stopping performance, depending on the type of curing mechanism of a curable resin constituting the water-stopping portion.

An object of the present invention is to provide an insulated electric wire having a water-stopping portion that has an excellent water-stopping performance and can be formed in a short time, and a wire harness including such an insulated electric wire.

Solution to Problem

In order to solve the above-described problems, an insulated electric wire according to the present invention includes: a conductor in which a plurality of elemental wires made of a metal material are twisted together; and an insulation covering that covers an outer circumference of the conductor, wherein the insulated electric wire includes: an exposed portion in which the insulation covering is removed from the outer circumference of the conductor; a covered portion in which the insulation covering covers the outer circumference of the conductor, the exposed portion and the covered portion being provided adjacent to each other in a longitudinal axis direction of the insulated electric wire; and a water-stopping portion in which gaps between the elemental wires in the exposed portion are filled with a water-stopping agent, and at least a portion of the water-stopping agent that is in contact with the elemental wires is made of a resin material that cures upon contact with the metal material of the elemental wires.

Here, preferably, at least the portion of the water-stopping agent that is in contact with the elemental wires has anaerobic curability. Also, preferably, the water-stopping agent is insulating. At least an outer circumferential portion of the water-stopping agent is made of a resin material that cures with external supply of energy or a substance. In this case, preferably, at least an outer circumferential portion of the water-stopping agent is made of a resin material that has light curability. Furthermore, preferably, the water-stopping agent is made of a resin material that is curable upon contact with the metal material of the elemental wires and is curable with external supply of energy or a substance. In this case, preferably, the water-stopping agent is made of a resin material that has both anaerobic curability and light curability.

Preferably, the density of the metal material per unit length is higher in the exposed portion than in at least a remote area of the covered portion other than an area adjacent to the exposed portion. Furthermore, preferably, a twist pitch of the elemental wires is smaller in the exposed portion than in the remote area of the covered portion.

Preferably, in the exposed portion, the water-stopping agent constituting the water-stopping portion covers the outer circumference of the conductor continuously from the gaps between the elemental wires. Furthermore, preferably, the water-stopping agent constituting the water-stopping portion covers an outer circumference of the insulation covering at an end of the covered portion that is adjacent to the exposed portion, continuously from an area of the exposed portion that covers the outer circumference of the conductor.

Preferably, the water-stopping portion is provided in a middle portion of the insulated electric wire in the longitudinal axis direction.

A wire harness according to the present invention includes the above-described insulated electric wire, and electric connections provided at both ends of the insulated electric wire, each of the electric connections being capable of connecting to other devices.

Here, preferably, one of the electric connections provided on the both ends of the insulated electric wire includes a waterproof structure for preventing entry of water from the outside, and the other one of the electric connections does not include any waterproof structure, and the water-stopping portion is provided at a position between the two electric connections.

Advantageous Effects of Invention

In the insulated electric wire according to the present invention, at least a portion of the water-stopping agent that is in contact with the elemental wires of the conductor is made of a resin material having a property (hereinafter, referred to also as contact curability) of being cured upon contact with the metal material of the elemental wires. Accordingly, it is possible to form a water-stopping portion having a superior water-stopping performance in which the water-stopping agent is cured while adhering to the elemental wires, and can prevent water from entering a gap between the elemental wires. Moreover, since the curing of the water-stopping agent starts and progresses upon filling the gaps between the elemental wires with the water-stopping agent and bringing the water-stopping agent into contact with the metal material of the elemental wires, the formation of the water-stopping portion by curing the water-stopping agent can be completed in a short time.

Here, if at least the portion of the water-stopping agent that is in contact with the elemental wires has anaerobic curability, the water-stopping agent will be cured while being blocked from contacting with oxygen. Since, upon filling the gaps between the elemental wires with the water-stopping agent, the water-stopping agent comes into contact with the metal material of the elemental wires, and the water-stopping agent on an interface with the elemental wires is blocked from coming into contact with external air by the layers of the water-stopping agent itself, the water-stopping agent having anaerobic curability is cured while adhering to the elemental wires, and a water-stopping portion having a superior water-stopping performance can be formed in a short time.

Also, if the water-stopping agent is insulating, the water-stopping agent also serves as an insulating member for insulating the conductor in the exposed portion from the outside.

If at least an outer circumferential portion of the water-stopping agent is made of a resin material that is cured with external supply of energy or a substance, in a portion inside the layers of the water-stopping agent that is in contact with the elemental wires, the water-stopping agent can be cured in a short time while adhering to the elemental wires using a curing reaction occurring upon contact with the metal material of the elemental wires, whereas in the outer circumferential portion, the water-stopping agent can be cured in a short time using external supply of energy or a substance. This water-stopping agent has an advantageous effect of forming a water-stopping portion having a superior water-stopping performance in a short time. It is possible to easily prevent the water-stopping agent from dropping from the outer circumferential portion of the layers of the water-stopping agent.

In this case, if at least an outer circumferential portion of the water-stopping agent is made of a resin material that has light curability, it is possible to effectively complete the curing of the water-stopping agent in the outer circumferential portion in a short time using particularly high curability.

Furthermore, if the water-stopping agent is made of a resin material that is curable upon contact with the metal material of the elemental wires and is curable with external supply of energy or a substance, the water-stopping agent has two types of curing mechanisms, and thus the entire area of the water-stopping agent can be cured in a short time mainly using the curing mechanism with contact with the metal material in the interface between the elemental wires and the water-stopping agent, and mainly using the curing mechanism with external supply of energy or a substance in the outer circumferential portion of the water-stopping agent. The water-stopping agent has an advantageous effect of forming layers of the water-stopping agent having a superior water-stopping performance in a short time.

In this case, if the water-stopping agent is made of a resin material that has both anaerobic curability and light curability, the water-stopping agent has a particularly advantageous effect of forming layers of the water-stopping agent that entirely has a superior water-stopping performance in a short time.

If the density of the metal material per unit length is higher in the exposed portion than at least in a remote area of the covered portion other than an area adjacent to the exposed portion, it is easy to form large gaps between the elemental wires in the exposed portion when forming the water-stopping portion. Accordingly, it is possible to easily form a water-stopping portion in which the water-stopping agent easily permeate the gaps between the elemental wires with high uniformity, and that has a superior water-stopping performance between the elemental wires.

Furthermore, if a twist pitch of the elemental wires is smaller in the exposed portion than in the remote area of the covered portion, the uncured water-stopping agent filling up the gaps between the elemental wires in the exposed portion is likely to stay in the gaps between the elemental wires when a water-stopping portion is formed. Since the resin material is curable upon contact with the metal material of the elemental wires, it is easy to form a water-stopping portion having a superior water-stopping performance, realizing the effect of the water-stopping agent being cured in a short time when coming into contact with the elemental wires, while eliminating an influence of dropping or flowing of the uncured water-stopping agent.

If, in the exposed portion, the water-stopping agent constituting the water-stopping portion covers the outer circumference of the conductor continuously from the gaps between the elemental wires, the water-stopping agent placed on the outer circumference of the conductor can play a role of a protecting member that physically protects the water-stopping portion.

Furthermore, if the water-stopping agent constituting the water-stopping portion covers an outer circumference of the insulation covering at an end of the covered portion that is adjacent to the exposed portion, continuously from an area of the exposed portion that covers the outer circumference of the conductor, the water-stopping agent can prevent entry of water between the elemental wires constituting the conductor, and also prevent entry of water between the insulation covering and conductor in the covered portion.

If the insulated electric wire includes the water-stopping portion in a middle portion of the insulated electric wire in a longitudinal axis direction, the water-stopping portion is easily formed in the insulated electric wire, and it is possible to effectively prevent water that has entered a gap between the elemental wires from one end of the insulated electric wire from moving to the other end along the wire conductor, using the water-stopping portion provided in the middle portion of the insulated electric wire.

The wire harness according to the present invention includes the above-described insulated electric wire, and electric connections provided at the both ends of the insulated electric wire, each of the electric connections being capable of connecting to other devices. Since the water-stopping agent constituting the water-stopping portion of the insulated electric wire is made of a resin material that is cured upon contact with the metal material of the elemental wires of the conductor, the water-stopping portion has a superior water-stopping performance. Accordingly, a wire harness having a superior water-stopping performance is realized. Particularly, even if water adheres to one of the electric connections on both ends, it is possible to effectively prevent the water from entering the other electric connection along the conductors constituting the insulated electric wire, and a device connected to this electric connection. Also, such a water-stopping portion having a superior water-stopping performance can be formed in a short time, and can be combined into the wire harness.

Here, if one of the electric connections provided on the both ends of the insulated electric wire includes a waterproof structure for preventing entry of water from the outside, and the other one of the electric connections does not include any waterproof structure, and the water-stopping portion is provided at a position between the two electric connections, even if water enters the electric connection that does not include any waterproof structure, it is possible to effectively prevent the water from entering the electric connection including the waterproof structure along the conductors constituting the insulated electric wire, and a device connected to this electric connection. Accordingly, it is possible to improve the effectiveness of the waterproof characteristic with the waterproof structure formed in one electric connection, and effectively protect a device in which this electric connection is formed from the entry of water.

BRIEF DESCRIPTION OF DRAWINGS

FIG. 4($a$) illustrates the wire before a water-stopping portion is formed, FIG. 4($b$) illustrates a partial exposure step, and FIG. 4($c$) illustrates a tightening step.

FIG. 5($a$) illustrates a loosening step, FIG. 5($b$) illustrates a filling step, and FIG. 5($c$) illustrates a retightening step.

FIG. 6($a$) illustrates a covering movement step, and FIG. 6($b$) illustrates a curing step.

DESCRIPTION OF EMBODIMENTS

A detailed description of an insulated electric wire and a wire harness according to an embodiment of the present invention will now be provided with reference to the drawings.

[Configuration of Insulated Electric Wire]
Overview of Insulated Electric Wire

Figure 1:
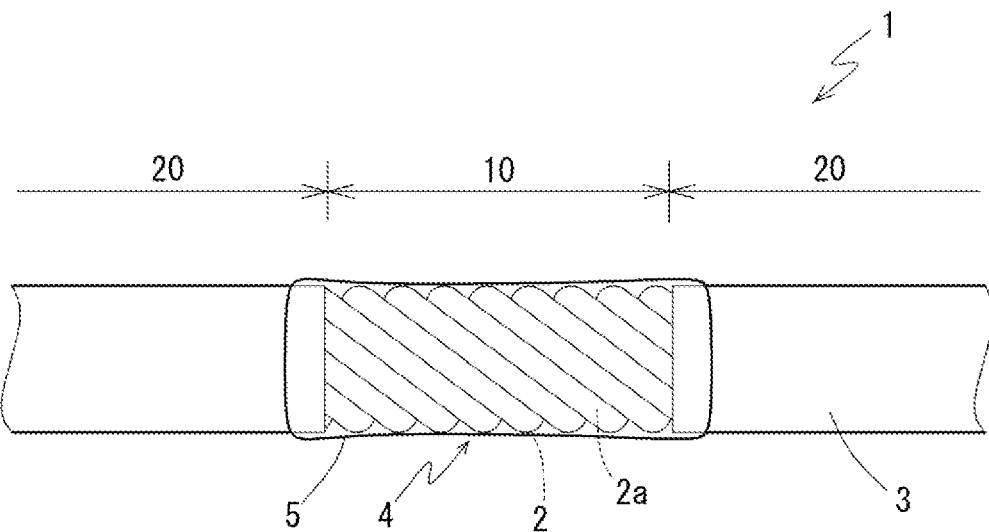
FIG. 1 is a perspective side view illustrating an insulated electric wire according to an embodiment of the present invention.

FIG. 1 illustrates an overview of an insulated electric wire 1 according to an embodiment of the present invention. The insulated electric wire 1 includes a conductor 2 obtained by twisting together a plurality of elemental wires 2$a$ made of a metal material, and an insulation covering 3 that covers the outer circumference of the conductor 2. A water-stopping portion 4 is formed in a middle portion of the insulated electric wire 1 in a longitudinal axis direction thereof.

The elemental wires 2$a$ constituting the conductor 2 may be made of any kind of metal material, and metal materials such as copper, aluminum, magnesium, and iron may be used. The metal material may be an alloy. Examples of added metal elements that can be used to form an alloy include iron, nickel, magnesium, silicon, and combinations thereof. All of the elemental wires 2$a$ may be made of the same metal material, or may include elemental wires 2$a$ made of multiple metal materials. Of the above-described metal materials, copper, aluminum, and an alloy mainly made of copper or aluminum are typically used as a constituent material of a conductor of an insulated electric wire for use in automobiles. However, as will be described later, if a water-stopping agent 5 having anaerobic curability is used, copper or a copper alloy may be particularly suitably used as the constituent material of the elemental wires 2$a$ in view of achieving a highly curable water-stopping agent 5.

There is no particular limitation to the twist structure of the elemental wires 2$a$ of the conductor 2, but a simple twist structure is preferable in view of, for example, easily increasing distances between the elemental wires 2$a$ when the water-stopping portion 4 is formed. For example, a twist structure in which the elemental wires 2$a$ are collectively twisted all together is preferred rather than a master-slave twist structure in which a plurality of strands each containing a plurality of twisted elemental wires 2$a$ are gathered and further twisted. Also, there is no particular limitation to the diameter of the whole conductor 2 and the diameter of each elemental wire 2$a$. However, the effect and significance of filling minute gaps between the elemental wires 2$a$ in the water-stopping portion 4 with the water-stopping agent 5 to improve reliability of the water-stopping characteristic is greater as the diameters of the whole conductor 2 and each elemental wire 2a are smaller, and thus it is preferable that the cross section of the conductor be about 8 mm$^2$ or smaller and the diameter of individual elemental wires be about 0.45 mm or smaller.

There is no particular limitation to the material constituting the insulation covering 3, as long as it is an insulating polymer material. Examples of such materials include a polyvinyl chloride (PVC) resin and an olefin-based resin. In addition to the polymer material, a filler or an additive may be contained as appropriate. Further, the polymer material may be cross-linked.

The water-stopping portion 4 includes an exposed portion 10 in which the insulation covering 3 is removed from the outer circumference of the conductor 2. In the exposed portion 10, gaps between the elemental wires 2a constituting the conductor 2 are filled with the water-stopping agent 5.

Preferably, in the exposed portion 10, the water-stopping agent 5 also covers the outer circumference of the conductor 2 continuously from the gaps between the elemental wires 2a in the exposed portion 10. Furthermore, as shown in FIG. 1, the water-stopping agent 5 is preferably placed on the outer circumferences of end portions of covered portions 20 adjacent to both sides of the exposed portion 10, that is, the outer circumferences of end portions of the insulation covering 3 in areas in which the insulation covering 3 covers the outer circumference of the conductor 2, continuously from the gaps between the elemental wires 2a and the outer circumferential portion of the conductor 2 in the exposed portion 10. In this case, the water-stopping agent 5 continuously covers the outer circumference, preferably the entire circumference, of an area extending from an end portion of the covered portion 20 located on one side of the exposed portion 10 to an end portion of the covered portion 20 located on the other side of the exposed portion 10. Further, the water-stopping agent 5 fills up the areas between the elemental wires 2a in the exposed portion 10, continuously from that outer circumferential portion.

At least an inner portion of the water-stopping agent 5, that is, a portion that is in contact with the elemental wires 2a of the conductor 2 is made of a cured resin material that is cured upon contact with the metal material constituting the elemental wires 2a. The constituent material of the water-stopping agent 5 will be described in detail later. The water-stopping agent 5 in the cured state prevents a fluid such as water from easily permeating through the water-stopping agent 5, and can have a water-stopping characteristic.

As described above, when the gaps between the elemental wires 2a in the exposed portion 10 are filled with the water-stopping agent 5, water stopping is realized at the areas between the elemental wires 2a, and a fluid such as water is prevented from entering the areas between the elemental wires 2a from the outside. Also, even if water enters a gap between the elemental wires 2a in one portion of the insulated electric wire 1, the water is prevented from moving to another portion of the insulated electric wire 1 along the elemental wires 2a. For example, water adhering to one end of the insulated electric wire 1 can be prevented from moving toward the other end of the insulated electric wire 1 through a gap between the elemental wires 2a.

If the water-stopping agent 5 covers the outer circumferential portion of the conductor 2 in the exposed portion 10, the water-stopping agent 5 has the function of physically protecting the exposed portion 10. In addition, if the water-stopping agent 5 is made of an insulating material, the water-stopping agent 5 has the function of insulating the conductor 2 in the exposed portion 10 from the outside.

Also, since the water-stopping agent 5 also covers the outer circumferences of the end portions of the covered portions 20 adjacent to the exposed portion 10 as one piece, water-stopping is possible between the insulation covering 3 and the conductor 2. That is to say, a fluid such as water is prevented from entering the gap between the insulation covering 3 and the conductor 2 from the outside. Also, even if water enters a gap between the insulation covering 3 and the conductor 2 in one portion of the insulated electric wire 1, the water is prevented from moving to another portion of the insulated electric wire 1 through the gap between the insulation covering 3 and the conductor 2. For example, water adhering to one end of the insulated electric wire 1 can be prevented from moving toward the other end of the insulated electric wire 1 through the gap between the insulation covering 3 and the conductor 2.

Note that in the present embodiment, the water-stopping portion 4 is provided in a middle portion of the insulated electric wire 1 in the longitudinal axis direction thereof in view of the magnitude of demand, easiness in increasing the distances between the elemental wires 2a, and the like, but the same water-stopping portion 4 may also be provided at an end portion of the insulated electric wire 1 in the longitudinal axis direction thereof. In this case, another member such as a terminal may be connected to the end portion of the insulated electric wire 1, or no member may be connected thereto. Also, the water-stopping portion 4 covered with the water-stopping agent 5 may include, in addition to the conductor 2 and the insulation covering 3, another member such as a connection member. Examples of the case where the water-stopping portion 4 includes another member include a case where the water-stopping portion 4 includes a splice portion in which a plurality of insulated electric wires 1 are joined to each other.

Constituent Material of Water-Stopping Agent

As described above, the water-stopping agent 5 constituting the water-stopping portion 4 in the insulated electric wire 1 according to the present embodiment is such that at least an inner portion thereof that is in contact with the elemental wires 2a of the conductor 2 is made of a cured resin material having a property of being cured upon contact with the metal material of the elemental wires 2a (hereinafter, referred to also as "contact curability").

Since the water-stopping agent 5 has contact curability, by filling a predetermined portion including gaps between elemental wires 2a with the water-stopping agent 5 that has not yet been cured and is flowable and then curing the water-stopping agent 5 in this state, it is possible to form the water-stopping portion 4. When the water-stopping agent 5 permeates the gaps between the elemental wires 2a constituting the conductor 2 through application, immersion, or the like, the water-stopping agent 5 comes into contact with a surface of the metal material of the elemental wires 2a, and thus after the gaps between the elemental wires 2a have been filled with the water-stopping agent 5, curing of the water-stopping agent 5 starts and progresses from the portion that is in contact with the metal material constituting the elemental wires 2a, even without performing a specific operation on the layers of the water-stopping agent 5.

In the water-stopping portion 4, it is important that the water-stopping agent 5 is cured while intimately adhering to the elemental wires 2a, in order to effectively prevent water from entering the areas between the elemental wires 2a and prevent the water from moving along the elemental wires 2a. If the water-stopping agent 5 does not have contact curability but only has a curing mechanism of being cured with external supply of energy or a substance, such as light curability, heat curability, moisture curability, or combinations thereof, it may be impossible to form a water-stopping portion 4 having a sufficiently good water-stopping performance on an interface between the elemental wires 2a and the water-stopping agent 5. This is because, if a factor for starting a curing reaction is energy or a substance such as light, heat, or moisture that is supplied from the outside of the layers of the water-stopping agent 5, the energy or the substance does not sufficiently reach the contact interface with the elemental wires 2a that is located at the inner-most position of the layers of the water-stopping agent 5, and the curing reaction on this contact interface is unlikely to progress, although the curing reaction is likely to progress in an outer portion of the layers of the water-stopping agent 5. Accordingly, the curing of the water-stopping agent 5 is unlikely to progress on the interface with the elemental wires 2a that requires the highest adhesion and the highest curability of the water-stopping agent 5 in order to ensure the water-stopping performance, and a sufficiently good water-stopping performance is unlikely to be realized on the interface. If a long time passes, the curing of the water-stopping agent 5 makes sufficient progress and a water-stopping portion 4 having a superior water-stopping performance can be formed even on the interface with the elemental wires 2a, but spending a long time to form a water-stopping portion 4 reduces the productivity when forming water-stopping portions 4 in a plurality of insulated electric wires 1.

In contrast, in the present embodiment, the water-stopping agent 5 has contact curability, and contact with the elemental wire 2a made of a metal material serves as a factor for starting the curing reaction, and thus the water-stopping agent 5 has much higher adhesion and curability in the portion that is in contact with the elemental wires 2a than the remaining portion. Accordingly, it is possible to form a water-stopping portion 4 obtained by curing the water-stopping agent 5 while the water-stopping agent 5 adhering to the elemental wires 2a, and has a superior water-stopping performance of strongly preventing entry of water into gaps between the elemental wires 2a or movement of the water through the gaps between the elemental wires 2a. Also, since a curing reaction starts and progresses immediately after the gaps between the elemental wires 2a have been filled with the water-stopping agent 5 through application, immersion, or the like, the water-stopping agent 5 that comes into contact with the surfaces of the elemental wires 2a can be cured without spending a long time. Accordingly, even if water-stopping portions 4 are formed in a plurality of insulated electric wires 1, it is possible to form the water-stopping portions 4 in a short time. The fact that the water-stopping portions 4 can be formed in a short time brings about effects of not only improving the productivity but also avoiding a reduction in the water-stopping performance of the water-stopping portion 4 caused by the uncured water-stopping agent 5 dropping or flowing without staying at a predetermined position.

As described above, the water-stopping agent 5 has contact curability, that is, the property of being cured upon contact with a metal material, and may undergo a curing reaction under the condition of contact with a metal material only, or if the condition of contact with a metal material and another condition are met. Examples of the condition to be met together with the condition of contact with a metal material include blocking molecular oxygen, and contact with another substance (hereinafter, referred to also as a curing initiating substance) such as water. Also, when the water-stopping agent 5 comes into contact with a curing initiating substance, the water-stopping agent 5 may start to cure without coming into direct contact with the metal material of the elemental wires 2a, and in such a case, when the curing initiating substance is placed in advance on the surfaces of the elemental wires 2a, and the water-stopping agent 5 is brought into contact with the surfaces of the elemental wires 2a covered with the curing initiating substance, the water-stopping agent 5 can be cured. Such a curing mechanism can also be included in "contact curability" in terms of the water-stopping agent 5 being cured upon contact with a surface of the metal material covered with the curing initiating substance.

An anaerobically curable material is known as a resin material that is cured if the condition of contact with a metal material and the condition of blocking molecular oxygen are met. An anaerobically curable material is cured from a liquid state to a solid state upon contact with a metal (solid metal or metal ion) with molecular oxygen contained in air or the like blocked. In this case, when the water-stopping agent 5 permeates portions between the elemental wires 2a constituting the conductor 2 through application, immersion, or the like, contact with air on the interface between the elemental wires 2a and the water-stopping agent 5 is blocked by the layers of the water-stopping agent 5 itself formed on the outer side of the interface. Accordingly, only by filling the gaps between the elemental wires 2a with the water-stopping agent 5 through application, immersion, or the like, both conditions of contact with a metal and blocking molecular oxygen are met without performing any specific operation on the layers of the water-stopping agent 5, and the curing of the water-stopping agent 5 starts and progresses from a portion that is in contact with the metal material of the elemental wires 2a.

If a resin material that is cured under a condition of contact with a curing initiating substance is used as the water-stopping agent 5, it is sufficient to place the curing initiating substance on surfaces of the elemental wires 2a constituting the conductor 2 through application, immersion, or the like before the water-stopping agent 5 permeates a portion between the elemental wires 2a. Then, when the gaps between the elemental wires 2a are filled with the water-stopping agent 5, the curing of the water-stopping agent 5 starts and progresses from the portion that is in contact with the surfaces of the elemental wires 2a on which the curing initiating substance is placed, without performing any specific operation on the layers of the water-stopping agent 5. Two-component curability is a possible example of such a curing mechanism of being cured under the condition of contact between the water-stopping agent 5 and the curing initiating substance.

As described above, there is no particular limitation to the metal material constituting the elemental wires 2a of the conductor 2. However, if a water-stopping agent having anaerobic curability is used as the water-stopping agent 5, the elemental wires 2a are preferably made of copper or a copper alloy. When the elemental wires 2a are made of copper or a copper alloy, the water-stopping agent 5 is likely to exhibit high anaerobic curability at a contact interface with the elemental wires 2a, compared to a case where the elemental wires 2a are made of aluminum or an aluminum alloy, for example. This is because the anaerobic curability of the water-stopping agent 5 is likely to progress due to electrons that are discharged when the oxidation number of copper is changed from +2 to +1.

The water-stopping agent 5 may also have another type of curing mechanism such as a mechanism of being cured with external supply of energy or a substance, as long as at least a portion of the water-stopping agent 5 that comes into contact with the elemental wires 2a of the conductor 2 has contact curability. Preferably, the water-stopping agent 5 has, in addition to contact curability, one or two or more other types of curability, in view of facilitating the curing of the water-stopping agent 5 with contact curability, and achieving a further improvement in curability and a reduction in curing time. For example, at least an inner portion of the water-stopping agent 5 that comes into contact with the elemental wires 2a of the conductor 2 has contact curability, and at least the outer circumferential portion of the water-stopping agent 5 that faces the external environment has another type of curability (hereinafter, referred to also as extrinsic curability) that causes a curing reaction with supply of energy or a substance from the outside of the water-stopping agent 5. Accordingly, the curability of the water-stopping agent 5 in the outer circumferential portion is improved or the curing time is reduced, which can lead to an improvement in the water-stopping performance, and can prevent the water-stopping agent 5 that is being cured from dropping or flowing. For example, the water-stopping agent 5 can be constituted by a plurality of layers, an inner layer that comes into contact with the elemental wires 2a can be made of a resin material having contact curability, and an outer layer on the outer circumference can be made of a resin material having extrinsic curability.

It is particularly preferable that the layers of the water-stopping agent 5 be entirely made of a resin material having both contact curability and extrinsic curability. This way, it is possible to achieve an improvement in the curability and a reduction in the curing time across all layers of the water-stopping agent 5. The curing mechanism with the contact curability may be dominant in a relatively inner area of the layers of the water-stopping agent 5, and the curing mechanism with the extrinsic curability may be dominant in a relatively outer area.

Examples of the extrinsic curability used together with contact curability include light curability, heat curability, and moisture curability. Out of these, light curability and heat curability correspond to the curing mechanism of being cured with external supply of energy, and moist curability corresponds to a curing mechanism of being cured with external supply of a substance. The water-stopping agent 5 may also have a plurality types of extrinsic curability.

As the extrinsic curability, light curability can be most appropriately used. A light curing reaction can progress the curing easily and fast using external light irradiation, and is highly effective to improve the curability of the water-stopping agent 5 and reduce the curing time. Particularly, if the water-stopping agent 5 is transmissive for light for use in curing, the curing can progress efficiently and in a short time from a superficial layer portion of the layers of the water-stopping agent 5 to a certain level of depth. As light curability, ultraviolet curability can be most appropriately used. A material that has anaerobic curability as the contact curability and light curability as the extrinsic curability can be most appropriately used as the water-stopping agent 5. Note that it is also conceivable to use a resin composition having heat plasticity instead of curability as the water-stopping agent 5, but a resin composition having curability such as contact curability is preferable because such a material does not need to be heated and melted and can be simply dealt with, and the damage of the insulation covering 3 due to heat can be avoided.

There is no particular limitation to the component composition of the water-stopping agent 5 and the properties thereof other than the curing property, but an insulating material is preferably used as the water-stopping agent 5 in view of insulating the conductor 2 from the outside. Also, there is no particular limitation to the specific type of the resin constituting the water-stopping agent 5. Examples of the resin include a silicone resin, an acrylic resin, an epoxy resin, and a urethane resin. Among them, an acrylic resin can be particularly suitably used in view of curing speed, reactivity, easiness in viscosity control, and the like. Various kinds of additives can be appropriately added to the resin material, as long as the properties of the resin material as the water-stopping agent 5 are not deteriorated.

A resin material can have contact curability such as anaerobic curability and extrinsic curability such as light curability, through addition of a reaction initiator or a catalyst thereto, introduction of a functional group to a polymer chain, and the like. For example, a resin material can have anaerobic curability through addition of organic peroxide or the like. Examples of organic peroxide include: hydroperoxides such as cumene hydroperoxide, t-butyl hydroperoxide, p-menthane hydroperoxide, methylethylketone peroxide, cyclohexane peroxide, dicumyl peroxide, and diisopropylbenzene hydroperoxide; ketone peroxides; diallyl peroxides; and peroxyesters. These organic peroxides may be used alone or may be used as a mixture of two or more types.

It is preferable that the water-stopping agent 5 be a resin composition having a viscosity of at least 4 Pa·s, more preferably at least 5 Pa·s, still more preferably at least 10 Pa·s upon filling. This is because, when the water-stopping agent 5 is placed at the areas between the elemental wires 2a and on the outer circumferential areas, especially on the outer circumferential areas, the water-stopping agent 5 hardly drops or flows and is likely to stay in these areas with high uniformity. On the other hand, it is preferable that the viscosity of the water-stopping agent 5 upon filling be kept at 200 Pa·s at the most. This is because, when the viscosity is not too high, the water-stopping agent 5 is likely to permeate into the areas between the elemental wires 2a sufficiently.

As described above, due to the contact curability, which requires contact with a metal as a curing requirement, the water-stopping agent 5 adheres to the surfaces of the elemental wires 2a constituting the conductor 2, and can form the water-stopping portion 4 having a superior water-stopping performance in the gaps between the elemental wires 2a and on the outer circumference of the conductor 2. Furthermore, if the water-stopping agent 5 covers the circumferences of end portions of the covered portions 20 adjacent to the exposed portion 10, together with the gaps between the elemental wires 2a and the outer circumferential portion of the conductor 2 in the exposed portion 10, it is preferable that the water-stopping agent 5 also exhibit high adhesion to the insulation covering 3. For example, the water-stopping agent 5 preferably has an adhesive force of 0.3 MPa or more with respect to a material such as PVC that constitutes the insulation covering 3. Note that if the water-stopping agent 5 has a sufficiently good water-stopping performance in the gaps between the elemental wires 2a but does not have a sufficient water-stopping performance in the outer circumferential portion of the conductor 2 and a portion between the insulation covering 3 and the conductor 2, such as a case where the water-stopping agent 5 does not have extrinsic curability, it is possible to make up for the water-stopping performance in the outer circumferential portion of the conductor 2 and the portion between the insulation covering 3 and the conductor 2, by arranging a shrinkable tube or the like made of a water-stopping material on the outer circumferences of the layers of the water-stopping agent 5.

State of Conductor in Water-Stopping Portion

As described above, in the water-stopping portion 4 of the insulated electric wire 1 according to the present embodiment, the water-stopping agent 5 permeates between the elemental wires 2a of the conductor 2 exposed as the exposed portion 10, and is cured. The state of the conductor 2 constituting the exposed portion 10 may be the same as the state of the conductor 2 in the covered portions 20 covered by the insulation covering 3, but it is advantageous that the states are different from each other in order for the water-stopping agent 5 to permeate and stay between the elemental wires 2a.

First, in the insulated electric wire 1, preferably, the density of the metal material per unit length (per unit length of the insulated electric wire 1 in the longitudinal axis) is not uniform and has a nonuniform distribution. Note that each of the elemental wires 2a is defined as a wire having a substantially uniform diameter continuously along the entire longitudinal axis of the insulated electric wire 1. In the present specification, the state where the density of the metal material per unit length is different between areas is defined as a state where the diameter and the number of the elemental wires 2a are constant, but the state of assembly of the elemental wires 2a such as the state of twist of the elemental wires 2a is different.

Specifically, it is preferable that the density of the metal material of the conductor 2 per unit length be higher in the exposed portion 10 than in the covered portions 20. However, the density of the metal material per unit length may be partially lower in adjacent areas 21 of the covered portions 20 that are immediately adjacent to the exposed portion 10 than in the exposed portion 10. In other words, the density of the metal material per unit length is higher in the exposed portion 10 than at least in remote areas 22 of the covered portions 20 other than the adjacent areas 21. In the remote areas 22, the state of the conductor 2 such as the density of the metal material per unit length is substantially equal to the state of the insulated electric wire 1 in which no water-stopping portion 4 is formed. Note that possible reasons why the density of the metal material can be reduced in the adjacent areas 21 include that the metal material is shifted to the exposed portion 10, and that the conductor 2 is deformed to ensure the continuation between the exposed portion 10 and the covered portions 20.

Figure 4:
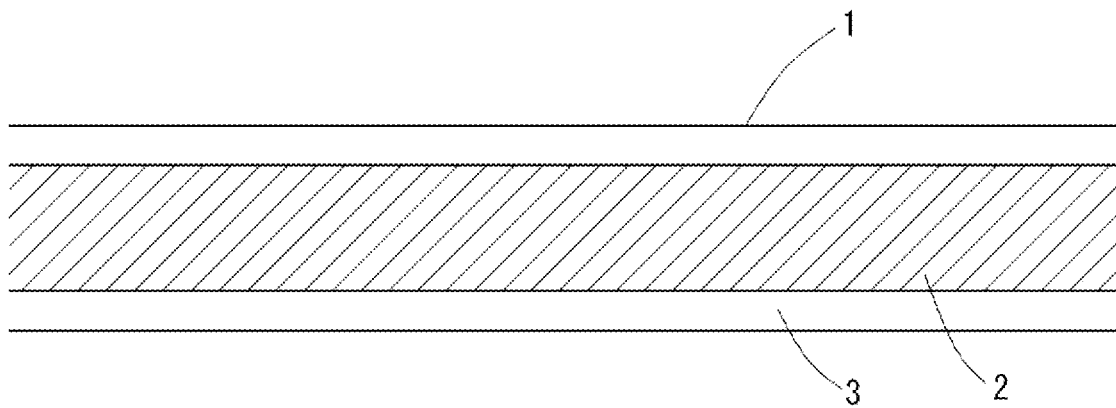
FIGS. 4($a$), 4($b$), and 4($c$) are cross-sectional views of the insulated electric wire, illustrating steps for producing the insulated electric wire.
Figure 4:
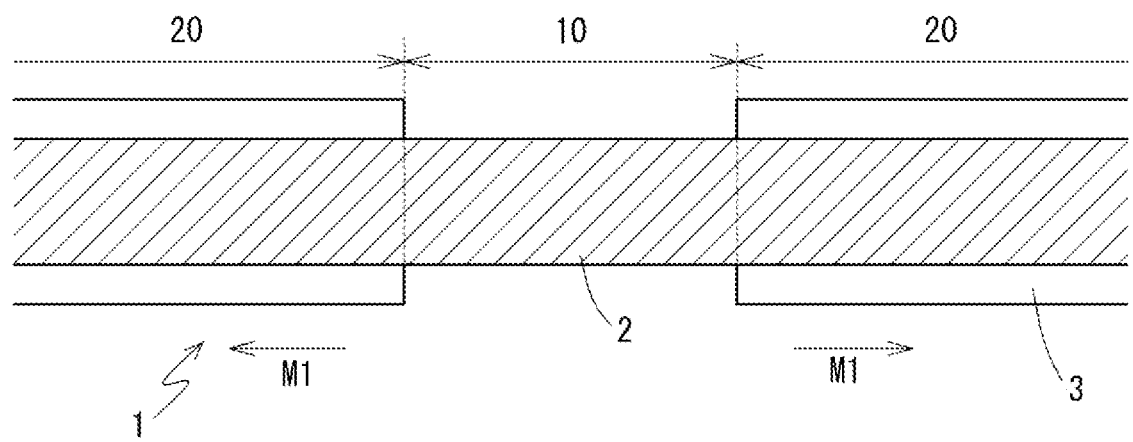
Figure 4:
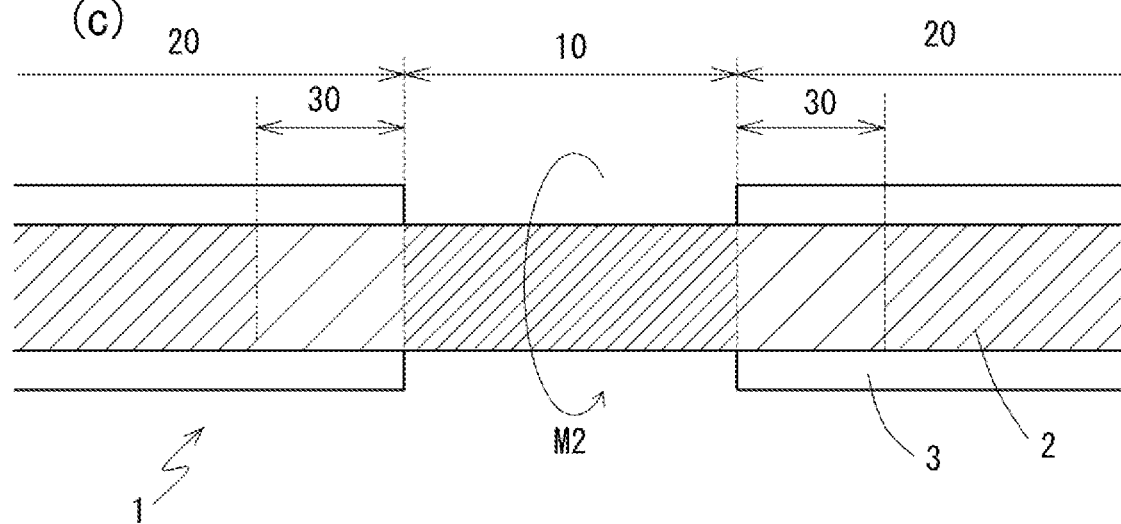
Figure 5:
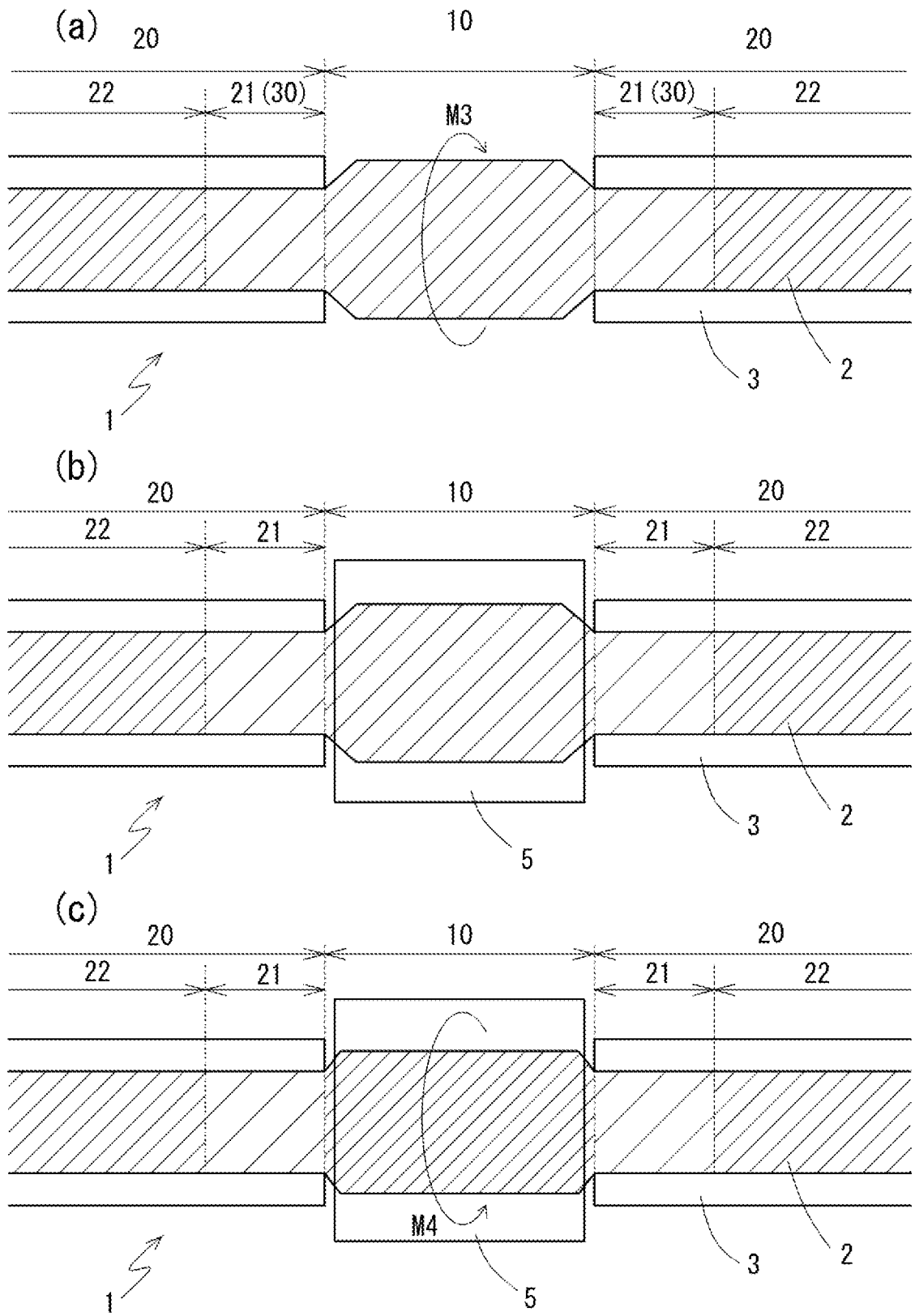
FIGS. 5($a$), 5($b$), and 5($c$) are cross-sectional views of the insulated electric wire, illustrating steps for producing the insulated electric wire.
Figure 6:
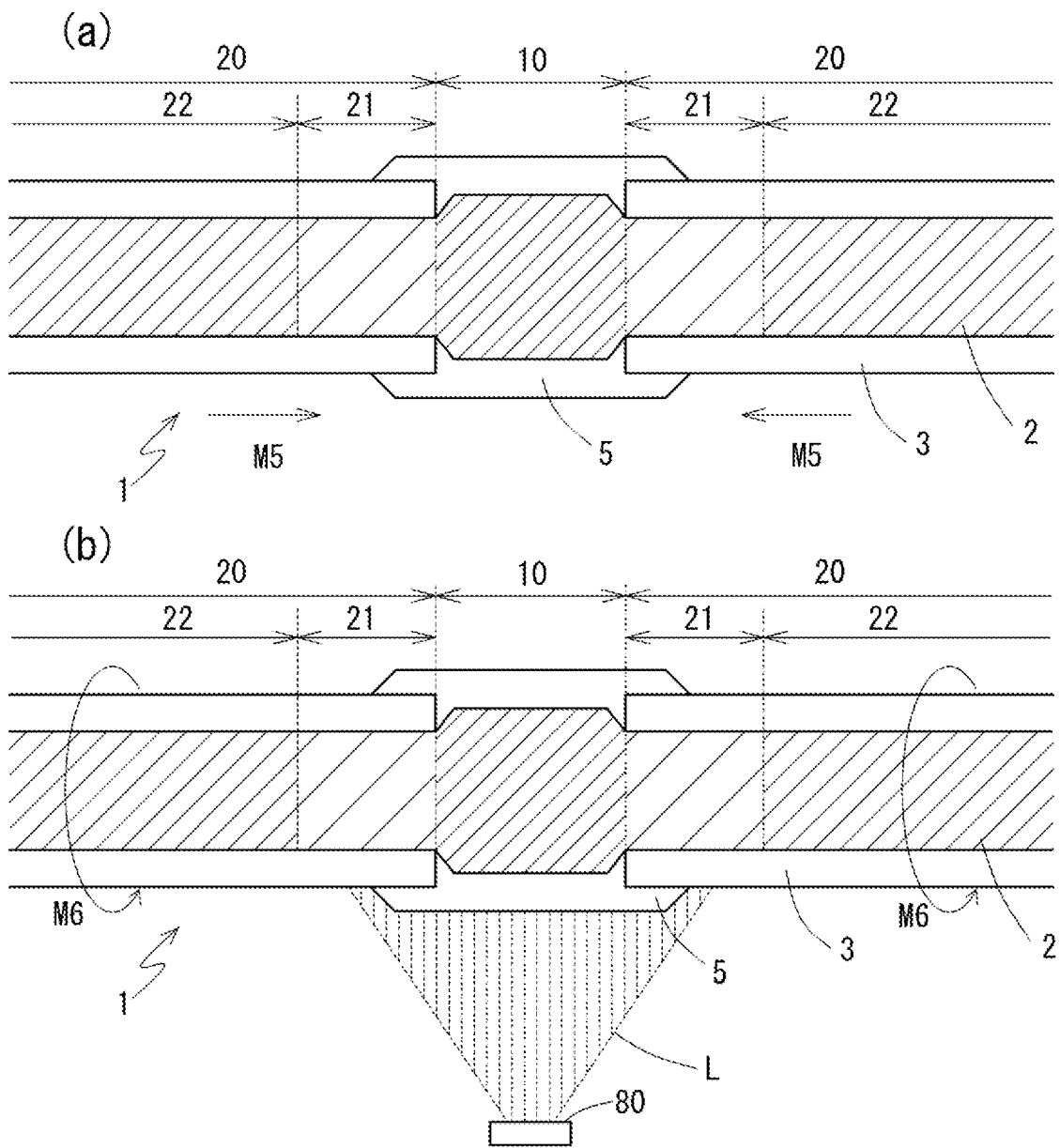
FIGS. 6($a$) and 6($b$) are cross-sectional views of the insulated electric wire, illustrating steps for producing the insulated electric wire.

FIG. 6(*b*) schematically illustrates a state of the conductor 2 having the density distribution of the metal material as described above. In FIGS. 4 to 6, the area inside the conductor 2 is hatched, and the higher the density of hatching is, the smaller the twist pitch of the elemental wires 2a is, that is, the smaller the distances between the elemental wires 2a are. Further, the larger the width (vertical length) of the area representing the conductor 2 is, the larger the diameter of the conductor 2 is. Those parameters in the drawings only schematically show the relative relationship of the sizes between the areas, and are not proportional to the twist pitch of the elemental wires 2a or the diameter of the conductor. Furthermore, the parameters in the drawings are discontinuous between different regions, but in the actual insulated electric wire 1, the state of the conductor 2 changes continuously between these regions.

As shown in FIG. 6(*b*), the conductor 2 has a larger diameter in the exposed portion 10 than in the remote areas 22 of the covered portions 20, and thus has a larger amount of metal material contained as elemental wires 2a per unit length in the exposed portion 10. Accordingly, by increasing the density of the metal material per unit length in the exposed portion 10 and the actual length of the elemental wires 2a included per unit length, it is possible to realize a state in which the elemental wires 2a are loosened, the distances between the elemental wires 2a are increased, and large gaps between the elemental wires 2a are secured, and thus the water-stopping agent 5 can permeate the gaps between the elemental wires 2a in this state, as will be described in detail later as a method for producing the insulated electric wire 1. As a result, the water-stopping agent 5 is more likely to permeate the gaps between the elemental wires 2a, and thus every part of the exposed portion 10 can be filled with the water-stopping agent 5 easily and highly uniformly.

Furthermore, it is preferable that the twist pitch of the elemental wires 2a be smaller in the exposed portion 10 than the twist pitch in the remote areas 22 of the covered portions 20, in addition to the density of the metal material per unit length that is higher in the exposed portion 10 than in the remote areas 22 of the covered portions 20. This is because the fact that the twist pitch of the elemental wires 2a is smaller in the exposed portion 10 and the distances between the elemental wires 2a are smaller in the exposed portion 10 also brings about an effect of improving the water-stopping performance. That is to say, if the distances between the elemental wires 2a are reduced during formation of the water-stopping portion 4 in which the gaps between the elemental wires 2a are filled with the water-stopping agent 5 in a liquid state, the water-stopping agent 5 is likely to stay in the gaps between the elemental wires 2a uniformly without dropping or flowing. If the water-stopping agent 5 is cured from this state, a superior water-stopping performance can be obtained in the exposed portion 10. Also, as a result of the twist pitch being smaller in the exposed portion 10 than in the remote areas 22, it is possible to suppress the conductor diameter in the exposed portion 10 so that it is not too large compared to the conductor diameter of the remote areas 22, even if the density of the metal material per unit length is higher in the exposed portion 10 than in the remote areas 22. Accordingly, the outer diameter of the entire water-stopping portion 4 can be made substantially the same as the outer diameter of the insulated electric wire 1 in the remote areas 22, or can be suppressed so as not to be much larger than that in the remote areas 22.

[Configuration of Wire Harness]

Figure 2:
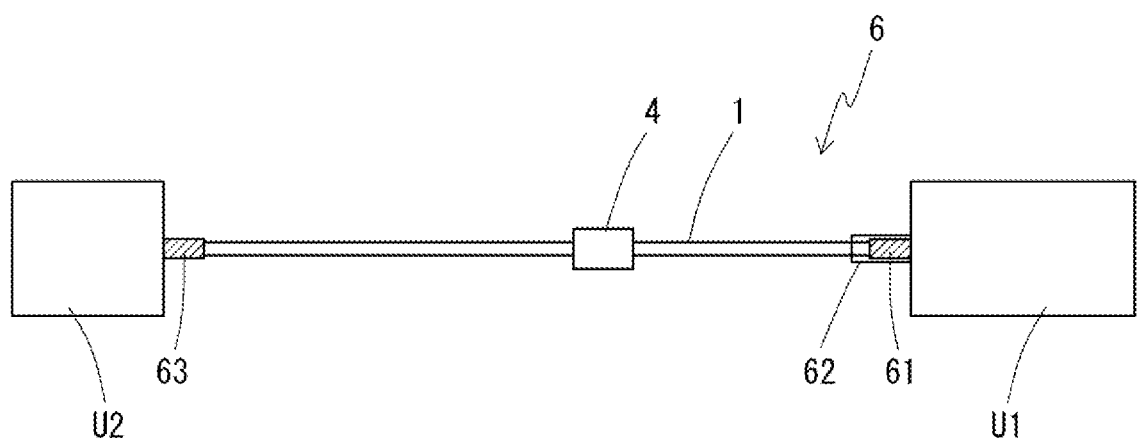
FIG. 2 is a schematic side view illustrating a wire harness according to an embodiment of the present invention, together with devices connected to both ends of the wire harness.

A wire harness 6 according to an embodiment of the present invention includes the above-described insulated electric wire 1 with the water-stopping portion 4 according to the embodiment of the present invention. FIG. 2 illustrates an example of the wire harness 6 according to the present embodiment. The insulated electric wire 1 constituting the wire harness 6 is provided with, at the respective ends thereof, electric connections 61 and 63 such as connectors that are capable of connecting to other device U1 and U2. The wire harness 6 may include, in addition to the above-described insulated electric wire 1 according to the embodiment, another type of insulated electric wire (not shown).

The wire harness 6 may employ any type of electric connections 61 and 63 provided at the respective ends of the insulated electric wire 1, and any type of devices U1 and U2 to which the electric connections 61 and 63 are connected, but an appropriate insulated electric wire 1 is such that one end thereof is waterproof while the other end is not waterproof, in view of efficient use of the water-stopping performance with the water-stopping portion 4.

As such an embodiment, the first electric connection 61 provided at one end of the insulated electric wire 1 includes a waterproof structure 62, as shown in FIG. 2. An example of the waterproof structure 62 is such that the connector constituting the first electric connection 61 is provided with a rubber stopper for sealing a space between a connector housing and a connector terminal. With the waterproof structure 62, even if water adheres to the surface or the like of the first electric connection 61, the water is unlikely to enter the first electric connection 61.

On the other hand, the second electric connection 63 provided at the other end of the insulated electric wire 1 does not include a waterproof structure as included in the first electric connection 61. Accordingly, if water adheres to the surface or the like of the second electric connection 63, the water may enter the second electric connection 63.

The exposed portion 10 in which the conductor 2 is exposed is formed in a middle portion of the insulated electric wire 1 constituting the wire harness 6, that is, at a position between the first electric connection 61 and the second electric connection 63, and in an area that includes this exposed portion 10, the water-stopping portion 4 filled with the water-stopping agent 5 is formed. There is no particular limitation to the specific position and number of the water-stopping portions 4, but at least one water-stopping portion 4 is preferably provided at a position closer to the first electric connection 61 than the second electric connection 63, in view of effectively suppressing the influence of water on the first electric connection 61 that has the waterproof structure 62.

The wire harness 6 including electric connections 61 and 63 at the both ends of the insulated electric wire 1 can be used to electrically connect two devices U1 and U2. For example, the first device U1 to which the first electric connection 61 having the waterproof structure 62 is connected may be a device such as an electric control unit (ECU) that requires waterproofing. On the other hand, the second device U2 to which the second electric connection 63 without any waterproof structure is connected may be a device that does not require waterproofing.

As a result of the insulated electric wire 1 constituting the wire harness 6 including the water-stopping portion 4, even if water that has externally entered the wire harness 6 moves along the elemental wires 2a constituting the conductor 2, it is possible to suppress the movement of the water along the insulated electric wire 1 from progressing beyond the water-stopping portion 4. That is to say, it is possible to suppress external water from moving beyond the water-stopping portion 4, reaching the electric connections 61 and 63 at the both ends, and further entering the devices U1 and U2 connected to the electric connections 61 and 63. For example, even if water adhering to a surface of the second electric connection 63 without any waterproof structure enters the second electric connection 63, and moves along the insulated electric wire 1 via the elemental wires 2a constituting the conductor 2, the movement of the water is stopped by the water-stopping agent 5 with which the water-stopping portion 4 is filled. As a result, the water cannot move to the side on which the first electric connection 61 is provided beyond the water-stopping portion 4, and can neither reach the position of the first electric connection 61 nor enter the first electric connection 61 and the first device U1. By suppressing water movement by the water-stopping portion 4 in this way, it is possible to efficiently use the waterproof characteristic of the waterproof structure 62 with respect to the first electric connection 61 and the device U1.

The effect of suppressing movement of water using the water-stopping portion 4 provided on the insulated electric wire 1 is realized regardless of the position at which the water adheres, the cause thereof, or the environment when or after the water adheres. For example, when the wire harness 6 is installed in an automobile, water that has entered a portion of the insulated electric wire 1, such as a gap between the elemental wires 2a, from the non-waterproof second electric connection 63 can be efficiently prevented from entering the first electric connection 61 having the waterproof structure 62 and the first device U1, due to capillary action or cold breathing. "Cold breathing" refers to a phenomenon in which, when the first electric connection 61 having the waterproof structure 62 and the first device U1 are heated when the automobile is driven for example, and then heat is discharged, the pressure on the first electric connection 61 side becomes lower and the pressure on the second electric connection 63 side becomes relatively higher, so that a difference in pressure occurs along the insulated electric wire 1, and water adhering to the second electric connection 63 climbs toward the first electric connection 61 and the first device U1.

[Method for Producing Insulated Electric Wire]

The following will describe an example of a method for producing the insulated electric wire 1 according to the above-described embodiment.

Figure 3:
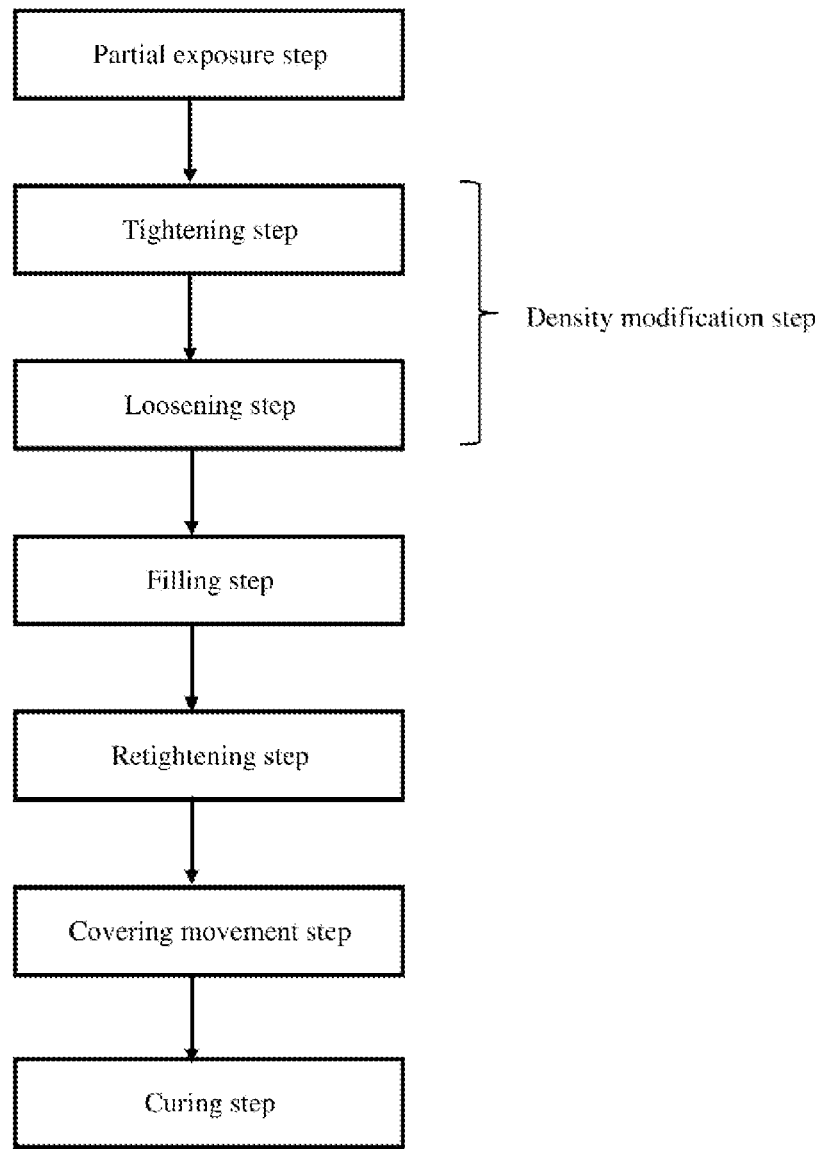
FIG. 3 is a flowchart illustrating steps for producing the insulated electric wire according to the embodiment.

FIG. 3 schematically illustrates the production method. In this method, the water-stopping portion 4 is formed in a partial area of the insulated electric wire 1 in the longitudinal axis direction thereof by performing: (1) a partial exposure step; (2) a density modification step; (3) a filling step; (4) a retightening step; (5) a covering movement step; and (6) a curing step, in this order. The density modification step (2) may include: (2-1) a tightening step; and subsequently (2-2) a loosening step. The steps will be explained below. Note here that a case in which the water-stopping portion 4 is formed in a middle portion of the insulated electric wire 1 will be described, specific operations in the steps and the order of the steps may be adjusted as appropriate in accordance with details of the configuration of a water-stopping portion 4 to be formed, such as a position at which the water-stopping portion 4 is to be formed.

(1) Partial Exposure Step

First, in the partial exposure step, an exposed portion 10 as shown in FIG. 4(b) is formed in a continuous linear insulated electric wire 1 as shown in FIG. 4(a). The covered portions 20 are provided adjacent to the both sides of the exposed portion 10 in the longitudinal axis direction thereof.

In an example of the method for forming such an exposed portion 10, a substantially ring-shaped slit is formed in the outer circumference of the insulation covering 3 substantially at the center of the area in which the exposed portion 10 is to be formed. Then, the regions of the insulation covering 3 located on both sides of the slit are held from their outer circumference, and are pulled apart along the axial direction of the insulated electric wire 1 (movement M1). Along with this movement, the conductor 2 is exposed between the regions of the insulation covering 3 on the both sides. In such a way, the exposed portion 10 is formed adjacent to the covered portions 20.

(2) Density Modification Step

Although the filling step may be performed and the gaps between the elemental wires 2a constituting the conductor 2 in the exposed portion 10 may be filled with the water-stopping agent 5 directly after the exposed portion 10 in which the conductor 2 is exposed has been formed in the partial exposure step, it is preferable to perform the density modification step before the filling step so that the gaps between the elemental wires 2a are enlarged and can be filled with the water-stopping agent 5 with high uniformity.

In the density modification step, a non-uniform distribution of the density of the metal material is formed among the exposed portion 10 on the one hand, and the adjacent areas 21 and the remote areas 22 of the covered portions 20 on the other hand, and the distances between the elemental wires 2a of the conductor 2 are increased in the exposed portion 10. Specifically, the non-uniform distribution of the density of the metal material is formed such that the density of the metal material per unit length is higher in the exposed portion 10 than in the remote areas 22. Such density distribution can be formed at the same time as when increasing the distances between the elemental wires 2a in the exposed portion 10 in the tightening step and the subsequent loosening step, for example.

(2-1) Tightening Step

As shown in FIG. 4(c), in the tightening step, the twist of the elemental wires 2a in the exposed portion 10 is temporarily tightened relative to the original state. Specifically, the insulated electric wire 1 is twisted and rotated in the direction of the twist of the elemental wires 2a so that the twist is further tightened (movement M2). With this, the twist pitch of the elemental wires 2a in the exposed portion 10 is reduced, and the distances between the elemental wires 2a are reduced.

During this operation, when the covered portions 20 located on the both sides of the exposed portion 10 are externally held at portions adjacent to the exposed portion 10, and the conductor 2 is twisted so that the holding portions (i.e., holding portions 30) are rotated in mutually opposite directions, the conductor 2 can be unwound from the holding portions 30 toward the exposed portion 10. As a result of the unwinding of the conductor 2, the twist pitch of the elemental wires 2a in the holding portions 30 is increased relative to the original pitch, and the density of the metal material per unit length is reduced from the original density, as shown in FIG. 4(c). Consequently, a portion of the metal material originally located in the holding portions 30 is shifted to the exposed portion 10, and the twist pitch of the elemental wires 2a in the exposed portion 10 is reduced by this shift. Also, the density of the metal material per unit length in the exposed portion 10 is increased. Note that it is preferable that a force of holding the insulated electric wire 1 in the holding portions 30 from the outer circumferential side be suppressed enough to allow the relative movement of the conductor 2 with respect to the insulation covering 3, in view of smoothly unwinding the conductor 2 from the holding portions 30 toward the exposed portion 10.

(2-2) Loosening Step

Thereafter, as shown in FIG. 5(a), in the loosening step, the twist of the elemental wires 2a in the exposed portion 10 is loosened again from the state where the twist has been tightened in the tightening step. The twist can be loosened by simply releasing the holding of the holding portions 30 or by holding the holding portions 30 and twisting and rotating the holding portions 30 in the direction opposite to the tightening direction of the tightening step, that is, the direction opposite to the twist direction of the conductor 2 (movement M3).

During the operation, the portions of the conductor 2 unwound from the holding portions 30 located on the both sides of the exposed portion 10 in the tightening step do not fully return into the areas covered with the insulation covering 3 due to the rigidity of the conductor 2, and at least partially remain in the exposed portion 10. As a result, the twist of the elemental wires 2a of the conductor 2 is loosened with the conductor 2 unwound to the exposed portion 10, and thus a state is realized in which the elemental wires 2a whose actual length is larger than the length before the tightening step is performed are bent and disposed in the exposed portion 10. That is, as shown in FIG. 5(a), in the exposed portion 10, the diameter of the area constituted entirely by the conductor 2 is larger than the diameter before the tightening step is performed (in FIG. 4(b)), and the density of the metal material per unit length is increased. The twist pitch of the elemental wires 2a in the exposed portion 10 is at least larger than the twist pitch in the state where the twist is tightened in the tightening step, and is larger than the twist pitch before the tightening step is performed depending on the degree of loosening. In view of increasing the distances between the elemental wires 2a, the twist pitch of the elemental wires 2a in the exposed portion 10 is preferably larger than the twist pitch before the tightening step is performed.

After the loosening step, the holding portions 30 of the covered portions 20 where the insulation covering 3 was held externally in the tightening step serve as the adjacent areas 21 in which the density of the metal material per unit length is lower than that in the exposed portion 10, and is also lower than that in the state before the tightening step is performed. The areas of the covered portions 20 that have not functioned as the holding portions 30 in the tightening step, that is, the areas distanced from the exposed portion 10, are defined as the remote areas 22. In the remote areas 22, the states of the conductor 2, such as the density of the metal material per unit length and the twist pitch of the elemental wires 2a, do not substantially change from the states before the tightening step is performed. The portion of the metal material in the adjacent areas 21 obtained as a result of the reduction in the density per unit length is shifted to the exposed portion 10, and contributes to increasing the density of the metal material per unit length in the exposed portion 10. As a result, the exposed portion 10 has the highest density of the metal material per unit length, the remote areas 22 have the next highest density, and the adjacent areas 21 have the lowest density.

(3) Filling Step

Next, in the filling step, the gaps between the elemental wires 2a in the exposed portion 10 are filled with the uncured water-stopping agent 5, as shown in FIG. 5(b). The filling operation with the water-stopping agent 5 may be performed by introducing liquid resin composition into the gaps between the elemental wires 2a using an appropriate method such as application, immersion, dripping, and injection that corresponds to such properties of the water-stopping agent 5 as viscosity.

In the filling step, in addition to filling the gaps between the elemental wires 2a with the water-stopping agent 5, it is preferable to also place the water-stopping agent 5 on the outer circumference of the conductor 2 in the exposed portion 10. To this end, for instance, the amount of the water-stopping agent 5 to be introduced into the exposed portion 10 only needs to be set such that the water-stopping agent 5 is left even after the gaps between the elemental wires 2a are filled. In this case, the water-stopping agent 5 may be placed on, in addition to the outer circumference of the exposed portion 10, the outer circumferential portion of the insulation covering 3 at the end portions of the covered portions 20. However, if the covering movement step is performed after the filling step, the water-stopping agent 5 introduced into the exposed portion 10 may be partially moved onto the outer circumferential portion of the insulation covering 3 in the covered portions 20 in the covering movement step. Accordingly, it is sufficient that the water-stopping agent 5 is placed on the outer circumference of the exposed portion 10 in addition to the gaps between the elemental wires 2a.

Since the distances between the elemental wires 2a in the exposed portion 10 are increased in the density modification step and then the water-stopping agent 5 is introduced into the exposed portion 10 in the filling step, the water-stopping agent 5 easily permeates the widened spaces between the elemental wires 2a. Accordingly, the water-stopping agent 5 can easily permeate every part of the exposed portion 10 evenly with high uniformity. Consequently, after the water-stopping agent 5 is cured, a reliable water-stopping portion 4 having an excellent water-stopping performance can be formed. Also, even if the water-stopping agent 5 has a relatively high viscosity such as 4 Pa·s or higher, the water-stopping agent 5 can permeate the gaps between the elemental wires 2a with high uniformity by sufficiently increasing the gaps between the elemental wires 2a.

As described above, a predetermined portion of the insulated electric wire 1 such as an area between the elemental wires 2a may be filled with the water-stopping agent 5 by any method such as application or immersion. However, the portion is preferably filled with the water-stopping agent 5 by immersion, in view of improving the uniformity in filling with the water-stopping agent 5 or operability when water-stopping portions 4 are formed in a plurality of insulated electric wires 1.

For example, a jet device for jetting the water-stopping agent 5 is preferably used to immerse the predetermined portion of the insulated electric wire 1 in the water-stopping agent 5. At this time, it is also possible to bring the insulated electric wire 1 into contact with the jet flow of the water-stopping agent 5 while rotating the insulated electric wire around its axis, in order to place the water-stopping agent 5 with high uniformity.

(4) Retightening Step

After the completion of the filling step, the retightening step is performed as shown in FIG. 5(c), and the distances between the elemental wires 2a are reduced in the exposed portion 10 in the state in which the gaps between the elemental wires 2a are filled with the water-stopping agent 5. Similar to the aforementioned tightening step in the density modification step for example, this step can be performed such that the covered portions 20 located on the both sides of the exposed portion 10 are held at the adjacent areas 21 externally from the insulation covering 3, and the conductor 2 is twisted and rotated in the direction of the twist of the elemental wires 2a so that the twist of the elemental wires 2a is tightened (movement M4). Note that in contrast to the tightening step, an operation of unwinding the conductor 2 to the exposed portion 10 is not performed in the retightening step.

When the gaps between the elemental wires 2a in the exposed portion 10 are narrowed in the retightening step, the water-stopping agent 5 is confined in the narrowed gaps. Thus, the water-stopping agent 5 is likely to stay in the gaps between the elemental wires 2a without flowing or dropping until the fluidity of the water-stopping agent 5 is sufficiently lowered due to curing or the like. Accordingly, after the water-stopping agent 5 is cured, a reliable water-stopping portion 4 having an excellent water-stopping performance is easily formed. To increase the effect, it is preferable that the twist pitch of the elemental wires 2a in the exposed portion 10 be reduced in the retightening step. For instance, it is preferable that after the retightening step, the twist pitch of the elemental wires 2a be smaller in the exposed portion 10 than in the adjacent areas 21 as well as in the remote areas 22.

The retightening step is preferably performed while the water-stopping agent 5 filling up the gaps between the elemental wires 2a is flowable, that is, before the water-stopping agent 5 is cured, or during the curing process. Accordingly, the retightening operation is unlikely to be impaired by the water-stopping agent 5.

Specifically, when the aforementioned filling step is performed by immersing the insulated electric wire 1 in the water-stopping agent 5 using the jet device or the like, the retightening step is preferably performed in a state in which the insulated electric wire 1 is immersed in the water-stopping agent 5. This can easily avoid a situation where the water-stopping agent 5 is unwound and removed from the gaps between the elemental wires 2a due to the retightening operation itself. For example, preferably, after the predetermined portion of the insulated electric wire 1 including the exposed portion 10 has been brought into contact with the jet flow of the water-stopping agent 5, and the water-stopping agent 5 has been placed into the gaps between the elemental wires 2a or the like as the filling step, the retightening step is performed by twisting and rotating the conductor 2 (movement M4) while the insulated electric wire 1 is in contact with the jet flow.

(5) Covering Movement Step

Next, in the covering movement step, as shown in FIG. 6(a), the regions of the insulation covering 3 located in the covered portions 20 on the both sides of the exposed portion 10 are moved towards the exposed portion 10, approaching each other (movement M5). Similar to the retightening step, the covering movement step is preferably performed while the water-stopping agent 5 filling up the exposed portion 10 is flowable, that is, before the water-stopping agent 5 is cured, or during the curing process. The covering movement step and the retightening step may also be performed substantially in a single operation. As described above, when the filling step is performed by immersing the insulated electric wire 1 in the water-stopping agent 5 using the jet device or the like, and the retightening step is performed in this state, preferably, the covering movement step is also performed in the state in which the insulated electric wire 1 is immersed in the water-stopping agent 5.

Even if there is an area in which the gaps between the elemental wires 2a cannot be filled with the sufficient amount of water-stopping agent 5 in the filling step at an end of the exposed portion 10 or the like, the water-stopping agent 5 will reach such an area in the covering movement step, and a state will be realized in which the gaps between the elemental wires 2a are filled with the water-stopping agent 5 in the entire exposed portion 10 in which the conductor 2 is exposed. Furthermore, a part of the water-stopping agent 5 placed on the outer circumference of the conductor 2 in the exposed portion 10 can be moved to the outer circumference of the insulation covering 3 in the covered portions 20. Thus, the water-stopping agent 5 is continuously placed over three areas, namely, the gaps between the elemental wires 2a in the exposed portion 10, the outer circumference of the conductor 2 in the exposed portion 10, and the outer circumferences of the parts of the insulation covering 3 at the ends of the covered portions 20.

Since the water-stopping agent 5 is placed over the three areas, it is possible to form a water-stopping portion 4 that has an excellent water-stopping performance in the areas between the elemental wires 2a, has an outer circumference physically protected and electrically insulated, and has an excellent water-stopping performance between the conductor 2 and the insulation covering 3, using the same material at the same time, after the completion of the subsequent curing step. The covering movement step may be omitted if, in the filling step, a sufficient amount of water-stopping agent 5 can be introduced into an area extending over the entire exposed portion 10, and further to an area including the end portions of the covered portions 20 located on the both sides of the exposed portion 10, for example.

(6) Curing Step

Finally, the water-stopping agent 5 is cured in the curing step. If the water-stopping agent 5 only has contact curability as a curing mechanism, it is sufficient to wait until at least the corresponding portion of the water-stopping agent 5 that is in contact with the elemental wires 2a constituting the conductor 2 is fully cured. After the curing step, an insulated electric wire 1 provided with a water-stopping portion 4 having an excellent water-stopping performance in the gaps between the elemental wires 2a can be obtained.

If the water-stopping agent 5 has contact curability as well as extrinsic curability as curing mechanisms, it is sufficient to additionally perform an operation for externally supplying energy or a substance to cure the water-stopping agent 5 using the extrinsic curability mechanism. If the water-stopping agent 5 has light curability as its extrinsic curability, it is sufficient to irradiate the water-stopping agent 5 with light L using a light source 80, as shown in FIG. 6(*b*). If the water-stopping agent 5 has heat curability as its extrinsic curability, it is sufficient to heat the water-stopping agent 5 using a heater or the like. If the water-stopping agent 5 has moisture curability as its extrinsic curability, it is sufficient to bring the water-stopping agent 5 into contact with moisture, for example by introducing atmosphere including water vapor.

In the curing step, as shown in FIG. 6(*b*), the insulated electric wire 1 is preferably rotated around its axis (movement M6) until the water-stopping agent 5 is fully cured. If the water-stopping agent 5 is cured without rotating the insulated electric wire 1, that is, while the insulated electric wire 1 remains unmoved, the uncured water-stopping agent 5 will drop in accordance with gravity, and the water-stopping agent 5 will be cured in a state in which a thicker layer of the water-stopping agent 5 is formed at a lower position in the gravity direction than at a higher position. Thus, after curing the water-stopping agent 5, the conductor 2 will be eccentric in the water-stopping portion 4, and there is a possibility that non-uniformity in the water-stopping performance or physical characteristics may occur along the circumferential direction of the insulated electric wire 1. For example, the material strength or the water-stopping performance of the water-stopping agent 5 may be impaired in a portion in which the layer thickness of the water-stopping agent 5 is reduced, while the water-stopping agent 5 is likely to be damaged when coming into contact with an external object in a portion in which the layer thickness of the water-stopping agent 5 is increased.

Accordingly, by performing the curing step while rotating the insulated electric wire 1 around its axis, the uncured water-stopping agent 5 is unlikely to stay at one position in the circumferential direction of the insulated electric wire 1, and the layers of the water-stopping agent 5 are likely to have a highly uniform thickness around the entire circumference. Thus, the eccentricity of the conductor 2 in the water-stopping portion 4 is reduced, making it possible to realize a water-stopping portion 4 having highly uniform water-stopping performance and physical characteristics.

Furthermore, if the water-stopping agent 5 has light curability as its extrinsic curability, performing the curing step while rotating the insulated electric wire 1 around its axis makes it possible to irradiate the entire insulated electric wire 1 in the circumferential direction with the light L from the light source 80, and thus the light curing of the water-stopping agent 5 over the entire circumference can progress uniformly. Note that if after the completion of the filling step, the retightening step, and the covering movement step, time is needed to move the insulated electric wire 1 between processing devices for example, before the curing step is started, the insulated electric wire 1 preferably continues to be rotated around its axis also during this time period, so that the water-stopping agent 5 is prevented from dropping at a specific position in the circumferential direction.

EXAMPLES

Hereinafter, examples of the present invention will be described. Here, differences in the water-stopping performance and the curing time between the types of curability of water-stopping agents were tested. Note however that the present invention is not limited to these examples.

Test Method (1) Preparation of Samples

An insulated electric wire was prepared by covering the outer circumference of a copper stranded conductor having a conductor cross-sectional area of 0.5 mm$^2$ (diameter of elemental wires: 0.18 mm; number of elemental wires: 20) with a PVC insulation covering having a thickness of 0.35 mm. An exposed portion having a length of 13 to 15 mm was formed at a middle portion of the insulated electric wire. Then, a water-stopping agent was used to form a water-stopping portion in the exposed portion. At this time, the steps were executed in the order shown in the flowchart of FIG. 3. The filling step, the retightening step, and the covering movement step were performed using a jet device in a state in which the portion of the insulated electric wire that includes the exposed portion was brought into contact with a jet flow of the water-stopping agent. Also, the curing step was performed while rotating the insulated electric wire around its axis.

In the curing step, the water-stopping agent was cured by an operation that corresponds to the type of curability of each curing agent, as stated below. The curing time, that is, time for which the curing operation continues was set to two types, namely, one minute and eight hours.

In the examples and comparative examples, the specific material used as the water-stopping agent, the type of curability of the material, and the operation performed to cure the material are as follows. All of the water-stopping agents are made of an acrylic resin.

Example 1: ThreeBond "1377B"; anaerobic curability; curable upon contact with a metal and under anaerobic condition Example 2: ThreeBond "3062F"; anaerobic curability and ultraviolet (UV) curability; curable with UV radiation Comparative Example 1: ThreeBond "3030"; only UV curability; cured with UV radiation Comparative Example 2: Cemedine "UV-220"; UV curability and moisture curability; curable with UV radiation and upon contact with water vapor Comparative Example 3: ThreeBond "3057"; UV curability and heat curability; curable with ultraviolet radiation and by heating (2) Evaluation of Water-Stopping Performance For the water-stopping portion of each of the examples and the comparative examples, a leakage test was conducted to evaluate the water-stopping performance between the elemental wires, and between the conductor and the insulation covering. Specifically, a region of each insulated electric wire extending from the water-stopping portion to one end was immersed in water, and an air pressure of 200 kPa was applied from the other end of the insulated electric wire. Then, the water-stopping portion and the end of the insulated electric wire that were immersed in the water were visually observed.

If it was confirmed that no bubble was generated from a portion between the elemental wires in the water-stopping portion upon application of the air pressure, the water-stopping performance was evaluated as "Good", that is, a good water-stopping performance. If it was confirmed that no bubble was generated at any of the portions between the elemental wires in the water-stopping portion, the middle portion of the water-stopping portion, and the end of the insulated electric wire, the water-stopping performance was evaluated as "Excellent", that is, a superior water-stopping performance. On the other hand, if bubbles were generated at a portion between the elemental wires in the water-stopping portion, the water-stopping performance was evaluated as "Poor", that is, an insufficient water-stopping performance.

Results

Table 1 indicates, together with the properties of the water-stopping agents, the results of the leakage tests when two types of curing time were used. In the table, "PVC adhesion" indicates values each measured when a layer of the corresponding water-stopping agent having an inner diameter of 6 mm and a thickness of 3 mm is applied to a PCV surface, and the surface is pulled in the vertical direction. "Density" indicates values measured using a BL-type rotary viscometer.

ability, moisture curability, and heat curability cannot sufficiently progress the curing of the water-stopping agent for a short time on an interface between the water-stopping agent and elemental wires of a conductor that is located inside of the layer of the water-stopping agent and that a factor such as light, moisture, or heat is unlikely to reach. Particularly, in Comparative Examples 1 and 3, even by letting a long time pass, the curing cannot sufficiently progress on the interface with the elemental wires that requires sufficient curing of the water-stopping agent in view of ensuring the water-stopping performance with respect to the conductor. Note that in all of the comparative examples, the water-stopping agent has an adhesion to PVC of 0.3 MPa or greater, and the evaluation of "Poor" in the water-stopping performance obtained in the leakage test can be associated with insufficient adhesion to the interface between the elemental wires constituting the conductor and the water-stopping agent, instead of an interface between the insulation covering and the water-stopping agent.

On the other hand, in Examples 1 and 2 in which the water-stopping agent has anaerobic curability, a superior water-stopping performance between the elemental wires was confirmed in the leakage test, not only when the water-stopping agent is cured for a long time of eight hours but also when the curing is ended in a short time of one minute. That is to say, the water-stopping agent was fully cured while adhering to the interface with the elemental wires of the conductor even with a short time, and a water-stopping portion having a superior water-stopping performance with respect to the wire conductor could be formed. It is appreciated that the reason is that since the water-stopping agent has anaerobic curability, the curing of the water-stopping agent sufficiently progressed even on the interface with the elemental wires located inside the layer of the water-stopping agent, due to contact with the metal of the elemental wires and blocking of air by the layer of the

TABLE 1

| | | Example 1 | Example 2 | Comparative Example 1 | Comparative Example 2 | Comparative Example 3 |
|---|---|---|---|---|---|---|
| Material properties | Curability | Anaerobic | Anaerobic + UV | UV | UV + Moisture | UV + Heat |
| | Viscosity | 2 | 15 | 16.5 | 12 | 35 |
| | PVC adhesion (MPa) | 0 | 1.6 | 1.5 | 0.31 | 0.9 |
| Leakage test results | Curing for 1 minute | Good | Excellent | Poor | Poor | Poor |
| | Curing for 8 hours | Good | Excellent | Poor | Good | Poor |

According to Table 1, in the comparative examples in which the corresponding water-stopping agent is cured with energy or a substance supplied from the outside of the layer of the water-stopping agent, no such a water-stopping portion that a superior water-stopping performance could be confirmed in a leakage test was formed for any of the water-stopping agents, at least when a curing operation is performed for a short time of one minute. In Comparative Example 2 where the water-stopping agent having UV curability and moisture curability was used, a water-stopping portion having a superior water-stopping performance could be formed if a long time of eight hours was spent, but the formation of the water-stopping portion having a superior water-stopping performance could not be completed for a short time of one minute.

From these results, it is appreciated that a curing mechanism using an externally supplied factor such as UV curwater-stopping agent itself. When the water-stopping agent has light curability instead of anaerobic curability as in Comparative Examples 1 to 3, one elemental wire may shield another elemental wire, and in such cases, sometimes, the contact interface between the elemental wires and the water-stopping agent is not irradiated with light, and light curing cannot sufficiently progress. However, when the water-stopping agent has anaerobic curability as in Examples 1 and 2, the curing of the water-stopping agent can sufficiently progress on such a shielded interface, with the anaerobic curing mechanism.

Furthermore, in Example 2 in which the water-stopping agent is adhesive to PVC, and has anaerobic curability as well as UV curability, it was confirmed that, even after the curing was completed in a short time of one minute, bubbles were not generated from not only the portions between the elemental wires but also a middle portion of the water-stopping portion and the end of the insulated electric wire, and a superior water-stopping performance can be realized in, in addition to the portions between the elemental wires, the outer circumferential portion of the water-stopping agent and portions between the water-stopping agent and the insulation covering. This is because the outer circumferential portion of the water-stopping agent was cured in a short time due to its UV curability in addition to the anaerobic curability. That is to say, using light irradiation, water stopping was realized for the portion between the elemental wires, and at the same time, an insulation covering layer that covers a conductor while adhering to the outer circumference of the conductor could be formed. Since the water-stopping agent has UV curability, the outer circumferential portion of the water-stopping agent can be easily cured, and thus this water-stopping agent is preferable in terms of easily preventing dropping of the water-stopping agent during the curing process.

As described above, it was confirmed that when a water-stopping agent has only extrinsic curability such as light curability, moisture curability, and heat curability, the water-stopping agent could not be fully cured in a short time on an interface with the elemental wires of the conductor located inside the layer of the water-stopping agent, and a water-stopping portion having a superior water-stopping performance could not be formed, whereas when a water-stopping agent has anaerobic curability, which is a type of contact curability, the water-stopping agent could be fully cured in a short time on an interface with the elemental wires, and a water-stopping portion having a superior water-stopping performance could be formed. Furthermore, when a water-stopping agent has both contact curability and extrinsic curability, the outer circumferential portion of the water-stopping agent could also be cured in a short time.

Embodiments of the present invention have been described in detail but the present invention is in no way restricted to the embodiments described above and can be modified variously in a range without departing from the gist of the present invention.

LIST OF REFERENCE NUMERALS

1 Insulated electric wire
2 Conductor
2a Elemental wire
3 Insulation covering
4 Water-stopping portion
5 Water-stopping agent
6 Wire harness
10 Exposed portion
20 Covered portion
21 Adjacent area
22 Remote area
61 First electric connection
62 Waterproof structure
63 Second electric connection

The invention claimed is:

1. An insulated electric wire comprising:
a conductor in which a plurality of elemental wires made of a metal material are twisted together; and
an insulation covering that covers an outer circumference of the conductor,
wherein the insulated electric wire comprises:
an exposed portion in which the insulation covering is removed from the outer circumference of the conductor;
a covered portion in which the insulation covering covers the outer circumference of the conductor, the exposed portion and the covered portion being provided adjacent to each other in a longitudinal axis direction of the insulated electric wire; and
a water-stopping portion in which gaps between the plurality of elemental wires in the exposed portion are filled with a water-stopping agent, and
at least a portion of the water-stopping agent that is in contact with the plurality of elemental wires is made of a resin material that cures upon contact with the metal material of the plurality of elemental wires,
wherein density of the metal material per unit length is higher in the exposed portion than in at least a remote area of the covered portion other than an area adjacent to the exposed portion.

2. The insulated electric wire according to claim 1, wherein the at least the portion of the water-stopping agent that is in contact with the plurality of elemental wires has anaerobic curability.

3. The insulated electric wire according to claim 1, wherein the water-stopping agent is insulating.

4. The insulated electric wire according to claim 1, wherein at least outer circumferential portion of the water-stopping agent is made of a resin material that cures with external supply of energy or a substance.

5. The insulated electric wire according to claim 4, wherein the at least the outer circumferential portion of the water-stopping agent is made of a resin material that has light curability.

6. The insulated electric wire according to claim 1, wherein the water-stopping agent is made of a resin material that is curable upon contact with the metal material of the plurality of elemental wires and is curable with external supply of energy or a substance.

7. The insulated electric wire according to claim 6, wherein the water-stopping agent is made of a resin material that has both anaerobic curability and light curability.

8. The insulated electric wire according to claim 1, wherein a twist pitch of the plurality of elemental wires is smaller in the exposed portion than in the at least the remote area of the covered portion.

9. The insulated electric wire according to claim 1, wherein, in the exposed portion, the water-stopping agent constituting the water-stopping portion covers an outer circumference of the conductor continuously from the gaps between the plurality of elemental wires.

10. The insulated electric wire according to claim 9, wherein the water-stopping agent constituting the water-stopping portion covers an outer circumference of the insulation covering at an end of the covered portion that is adjacent to the exposed portion, continuously from an area of the exposed portion that covers the outer circumference of the conductor.

11. The insulated electric wire according to claim 1, wherein the water-stopping portion is provided in a middle portion of the insulated electric wire in the longitudinal axis direction.

12. The insulated electric wire according to claim 1, wherein the resin material of the water-stopping agent has a viscosity of at least 2 Pa·s.

13. A wire harness comprising:
the insulated electric wire according to claim 1; and
electric connections provided at both ends of the insulated electric wire, each of the electric connections being capable of connecting to another device.

14. The wire harness according to claim 13,
wherein one of the electric connections provided on the both ends of the insulated electric wire includes a waterproof structure for preventing entry of water from the outside, and an other one of the electric connections does not include any waterproof structure, and
the water-stopping portion is provided at a position between the electric connections on both ends of the insulated electric wire.

* * * * *